Figure 1:
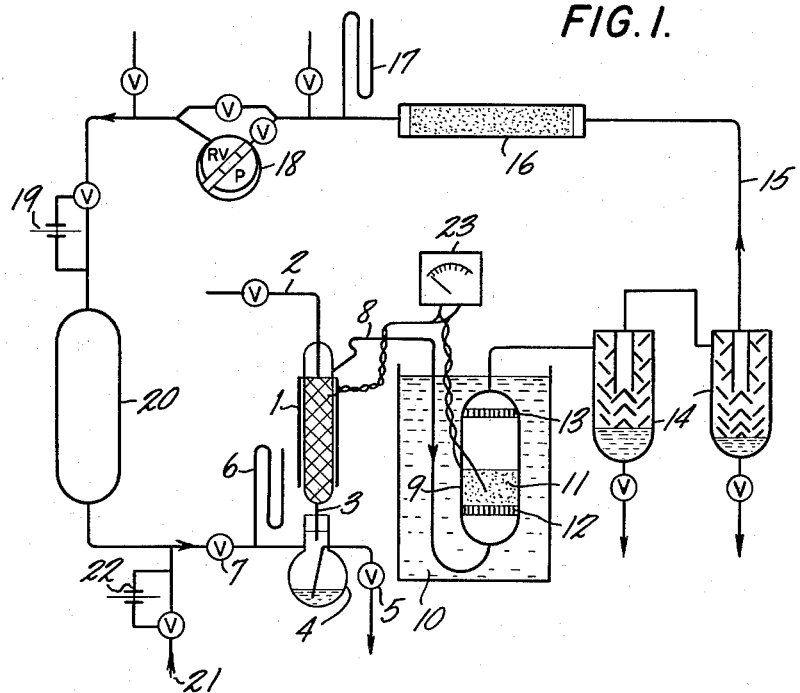

Feb. 7, 1961 D. SZABO 2,971,016
HYDROGENATION PROCESS
Filed Oct. 13, 1958

INVENTOR.
DENIS SZABO
BY
Brumbaugh, Free, Graves & Donohue
His ATTORNEYS

# United States Patent Office 2,971,016
Patented Feb. 7, 1961

2,971,016

HYDROGENATION PROCESS

Denis Szabo, Ville Neuf, La Garenne, France, assignor to Lever Brothers Company, New York, N.Y., a corporation of Maine Filed Oct. 13, 1958, Ser. No. 766,728

Claims priority, application Great Britain Oct. 15, 1957

13 Claims. (Cl. 260—409)

This invention relates to a process for hydrogenating unsaturated fatty acids and their esters.

The hydrogenation of unsaturated higher fatty acids is usually carried out in the liquid phase in the presence of a catalyst, for instance a nickel catalyst, and a superatmospheric pressure is employed in order to promote the hydrogenation. Such a process is however not entirely satisfactory as the hydrogenated fatty acids produced tend to be dark in colour, the product is contaminated by metal soaps formed from the catalyst, and the catalyst may easily become poisoned. In order to minimise these difficulties careful purification of the materials is necessary both before and after the hydrogenation.

Unsaturated fatty acids can be hydrogenated in the vapour phase by passing a mixture of fatty acid vapour and hydrogen over a fixed bed of solid nickel catalyst. In such a process it is necessary to employ atmospheric pressure or above in the reactor in order to ensure a sufficient speed of reaction, and the relatively high temperatures required for vapourising higher fatty acids at such pressures unfavourably affect the purity of the resulting hydrogenation products.

It has now been found that unsaturated fatty acids can be hydrogenated in the vapour phase at pressures below atmospheric pressure by using a catalyst in fluidised form, and that such a procedure produces unexpectedly advantageous results. Indeed, such a process enables the disadvantages mentioned above in connection with liquid phase hydrogenation and the use of solid fixed bed catalysts to be avoided, for hydrogenation can be carried out continuously at a reasonable speed using relatively low temperatures, and the formation of coloured products can be very much reduced, even when impure fatty acids are used as starting materials.

Such favourable results were quite unexpected, as it has hitherto been considered necessary to use hydrogenation pressures of the order of one atmosphere and above in order to obtain a satisfactory speed of hydrogenation. It would be expected that in order to improve the speed of hydrogenation it would be necessary to increase the hydrogenation pressure, but it has been discovered that hydrogenation can actually be speeded up by carrying out a process in which markedly reduced pressures are used and the fatty acid vapour and hydrogen are passed through a fluidised catalyst at a velocity high enough to maintain the catalyst in a fluidised state. This increase in speed of hydrogenation is valuable, as it enables increased through-put for any given size of plant.

Moreover the new process can be applied to esters of unsaturated fatty acids and especially the methyl and ethyl esters.

Accordingly the process of the present invention is one for the hydrogenation of a fatty material which is an unsaturated fatty acid or its ester, the process comprising passing a mixture of hydrogen gas and vapourised fatty material the total pressure of which is less than atmospheric through a pulverulent hydrogenation catalyst at a speed sufficient to maintain the catalyst in the form of a fluidised bed.

The acyl group of the unsaturated fatty acid or its ester is preferably one containing from 10 to 24 carbon atoms. Unsaturated fatty acids which are particularly suitable for hydrogenation using the process of the invention are oleic, linoleic and linolenic acids: esters of these acids can also be used, and their methyl and ethyl esters are especially suitable. Where an ester is used, it will of course be one which is vapourisable at the working pressure and temperature concerned without too serious a decomposition: in practice, therefore, the ester will be one derived from an alcohol of low molecular weight. Mixture of unsaturated fatty acids from natural oils, for instance whale oil or sunflower oil, can be used as starting materials. The unsaturation can be ethylenic or acetylenic. It is preferable to remove dissolved air from the starting materials before they are hydrogenated, in order to minimise polymerisation or other side reactions when the materials are vapourised.

The speed and course of the hydrogenation reaction will depend in any given instance on the temperature employed and the relative amounts of hydrogen and material to be hydrogenated in the vapourised mixture which is passed through the fluidised catalyst. In turn, the temperature to which the vapours are heated before passing through the catalyst will depend upon the particular pressure used, for by lowering the pressure the quantity of fatty acid vapour in proportion to hydrogen can be increased and the temperature necessary to give adequate vapourisation of the material to be hydrogenated is thus itself lowered. By the hydrogenation pressure, or pressure at which the hydrogenation process is carried out, is meant the pressure at which the vapours enter the fluidised bed: the range of satisfactory hydrogenation pressures is limited by the need to maintain the catalyst in a fluidised state, and hence by the velocity of the vapours through the fluidised bed, which in turn is in practice dependent upon the size and design of the reactor and the efficiency with which the vapour products can be pumped away from the reactor. In general, however, pressures of less than 500 mm. of mercury can be used, and it is preferable to employ pressures of less than 260 mm. and especially a pressure within the range 40 to 200 mm. A suitable temperature is in general one above 150° C., and when unsaturated fatty acids having from 12 to 24 carbon atoms are employed the temperature is preferably within the range of from 200° to 260° C. Reactor capacity can be increased by enlarging the diameter of the reactor, but the diameter of the reactor should not be so large that there is a danger of channeling the fluidised bed and thus losing efficiency: this can be avoided by employing two or more fluidised beds in parallel relationship. A moving fluidised bed technique can also be used, in which catalyst is carried out of the reactor by the gases, recovered and recirculated to the base of the reactor.

Depending upon the precise conditions used, the hydrogenation may be partial (in which case it may also be selective), or it may be complete. The degree of hydrogenation is influenced by the thickness of the fluidised catalyst bed.

Catalysts of the type generally employed for hydrogenating unsaturated fatty acids can be used, and nickel and palladium catalysts are especially suitable. The catalyst needs to be in a sufficiently finely divided state to be suitable for the formation of a fluidised bed. Unless a moving bed technique is used, the catalyst particle size should be sufficiently large to minimise the loss of catalyst by removal with the gases issuing from the reactor: at the same time the catalyst should be sufficiently light to form the fluidised bed under the conditions of vapour flow adopted in any particular instance. A particularly valuable form of catalyst is one in which the catalytic material is deposited on the surface of particles of a carrier of suitably light inert material, for instance alumina. Such a carrier can suitably have a particle size of between 60 and 120 microns diameter, and an alumina having particles 90% of which have a diameter of from 60 to 120 microns is generally satisfactory: alumina of this kind is commercially available. Larger and heavier particles can be used for fast moving vapours where a moving bed technique is not employed. The carrier can be chosen to give any desired spread of particle sizes within the range. It has been found satisfactory to employ a catalyst of nickel deposited on alumina as carrier. Other carriers which can be used are silica, pumice, and active charcoal. However the catalyst particles can be used without a carrier when they are of appropriate size and the conditions of operation are suitable. Esters are particularly suitable for hydrogenation using nickel catalysts as they do not possess the tendency to form nickel soaps and reduce the life of the catalysts which is shown by the free acids. It is preferable with the free acids to use a catalytic material which does not form a soap, for instance, palladium.

The loss of catalyst particles from the reactor can be reduced by the use of a suitable filter at the exit from the reactor, but it is desirable to avoid filters which seriously hold up the flow of vapours and thus result in an increased pressure in the reactor. A bag filter made of temperature-resistant material, for instance glass fibre, and having a large surface area can be used to remove very small particles.

The results obtained using the process of the invention can be spectacular. Thus it is possible to take a black fatty acid oil, for instance the acid from whale oil, which normally gives brown distillation products, and hydrogenate it quickly and completely in a single step to a hard, snow-white product suitable for use in toilet soap manufacture. Such a product cannot be obtained by hydrogenation in the liquid phase even when the starting material and product are each purified by distillation.

Figure 2:
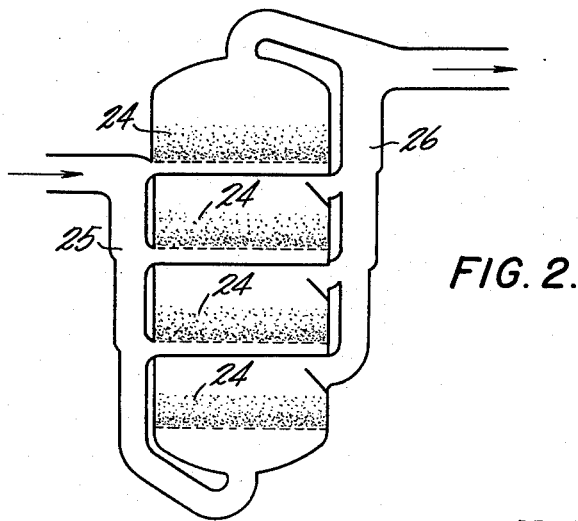

A suitable arrangement of apparatus for carrying out the process of the invention on a small scale is illustrated diagrammatically in Figure 1 of the accompanying drawings, and a multiple reactor which can be used in the process of the invention is shown diagrammatically in Figure 2.

In Figure 1, a flash distillation column 1, of height 30 cm. and diameter 3 cm., packed with Raschig rings or graded coke and supplied with a heating jacket, is provided with an inlet 2 at its head for the material to be hydrogenated and a bottom outlet 3 leading to a receiver 4 for unvapourised material which can be withdrawn through a valve 5. Hydrogen at a pressure measured by a manometer 6 can be supplied to the neck of the receiver 4 through a tube with a valve 7. A tube 8 leads from the head of column 1 to the bottom of a reactor 9 maintained in an oil bath 10. The reactor, of height 26 cm. and diameter 8 cm., contains catalyst 11 for the formation of a fluidised bed above a vapour-permeable base 12, and near its head a filter 13 for preventing the entrainment of catalyst particles. From the head of the reactor a tube leads to two condensers 14 in series for collecting hydrogenated material and provided with outlets for withdrawal of condensed product. A tube 15 leads from the second condenser 14 to a cylinder 16 filled with activated carbon for purification of unused hydrogen gas, whose pressure at the outlet of the cylinder is measured by a manometer 17. The outlet of the cylinder 16 is connected to a rotary vacuum pump 18, which leads to a flowmeter 19 and thence to a gas buffering chamber 20. The outlet of the chamber 20 is joined by a fresh hydrogen supply system 21, having its own flowmeter 22 and the joined tubes lead through the valve 7 into the receiver 4. Means 23 are provided for measuring the temperature within the column and reactor.

The multiple reactor shown in Figure 2 has four compartments 24 in parallel relationship, each containing catalyst for the formation of a fluidised bed, through which hydrogen and the material to be hydrogenated can pass from an inlet manifold 25 to an outlet manifold 26.

The invention is illustrated by the following examples, in which the rate of flow of hydrogen gas is expressed in litres at N.T.P. per hour.

*Example 1*

This example describes the hydrogenation of whale oil fatty acid using the apparatus described above and illustrated in Figure 1. The reactor used contained 90 g. of a granular catalyst consisting of an alumina carrier on which was deposited 14 g. of nickel, the granules having a mean diameter of about 90 microns. The catalyst was one prepared by adding aqueous nickel sulphate solution and alkali to a suspension of alumina in hot water: the precipitated catalyst thus obtained was filtered off, washed, dried and reduced at 360° C. before use.

De-aerated whale oil fatty acid obtained by the acidification of whale oil soapstock was fed at a rate of 50 g. per hour through the inlet 2 and into the column 1, which was maintained at a temperature of 230° C. Hydrogen gas at a rate of 200 litres per hour and at a pressure of 15 mm. of mercury above atmospheric pressure, was passed through the valve 7 from which it entered the receiver 4 at an absolute pressure of 120 mm. The hydrogen flowed up the column 1 carrying with it vapourised fatty acid, and the vapour mixture passed through the tube 8 with a total pressure of 120 mm. and a partial pressure of fatty acid of about 15 mm., and thence into the reactor 9 heated by its oil bath to 230° C. The flow of the vapour mixture maintained the catalyst in a fluidised state, and hydrogenation proceeded rapidly at a pressure of 110 mm. The gaseous reaction products passing into the condensers maintained at 70° C., in which hydrogenated fatty acid condensed as a completely colourless liquid at a rate of about 50 g. per hour. Liquid withdrawn from the condensers from time to time crystallised on further cooling to a snow-white product having a melting point of 49° C.

Unused hydrogen was pumped out of the condenser through the cylinder 16 by the rotary pump 18 at a pressure of 90 mm. as measured by the manometer 17. The hydrogen pumped out was passed through the buffering chamber 20 and back into the receiver 4. At the same time fresh hydrogen entered from the supply system 21 through valve 7 at a rate of 9 litres per hour as measured by the flowmeter 22, this quantity of gas being equal to the hydrogen consumed during the reaction.

An unsaturated fatty acid obtained by acidifying sunflower oil was hydrogenated in exactly the same way to a solid product with a melting point of 57° C.

*Example 2*

A sample of whale oil fatty acid was hydrogenated by the procedure of Example 1, but using different conditions. The precipitated nickel on alumina catalyst (10.4 g.) used contained 6.4% of nickel, the temperatures of the flash column and the reactor bath were both 240° C., 80 litres per hour of hydrogen were used, and the hydrogenation pressure was 90 mm. During 2 hours of reaction 33 g. hydrogenated fatty acid was collected. Samples of the product being condensed after 1 hour and again after 2 hours were tested for their melting point and unsaturation: the samples respectively had melting points of 55° C. and 54° C., and iodine numbers of 15.5 and 29.1. The whale oil fatty acid used as starting material had an iodine number of 173.

*Example 3*

Whale oil fatty acid was hydrogenated by the procedure of Example 1 using a nickel on alumina catalyst (17.6 g.) with a nickel content of 6.5% and a reactor bath temperature of 240° C. Hydrogenation was conducted at a hydrogenation pressure of 140 mm. using 100 litres of hydrogen per hour for 2 hours, during which 25 g. of hydrogenated acid was collected. Samples of the product formed after 1, 1½ and 2 hours had respectively melting points of 56.5°, 56° and 55.5° C., and iodine numbers of 10.9, 14.9 and 24.5.

Example 4

Using the same procedure as before, a nickel on alumina catalyst was used to hydrogenate crude oleic acid. The catalyst (10 g.) contained 7% of nickel, and the reactor bath temperature was 240° C. Using a hydrogenation pressure of 180 mm. and 140 litres per hour of hydrogen, the hydrogenation was continued for a period of 6 hours, during which 73 g. of hydrogenated acid was collected. Samples were taken from time to time and their melting points, iodine numbers and refractive indices were measured: the results are given in Table 1.

TABLE 1

| Time of taking sample | Melting point, ° C. | Iodine number | Refractive index, $n_D^{65}$ |
| --- | --- | --- | --- |
| 1 | 37 | | 1.4301 |
| 1½ | 41.5 | 8.9 | 1.4321 |
| 2 | 37.5 | | 1.4338 |
| 2½ | | | 1.4342 |
| 3 | 39.5 | | 1.4346 |
| 4 | 38 | 29.3 | 1.4356 |
| 5 | 40.5 | | 1.4356 |
| 5½ | 43.5 | | 1.4350 |
| 6 | 44 | 28.6 | 1.4350 |

The liquid starting material had an iodine number of 75.4 and a refractive index of $n_D^{65}$ 1.4400: analysis by gas chromatography showed the starting material and the sample taken at 5½ hours to have the constituents (percent by weight) given in Table 2.

TABLE 2

| | Crude oleic acid | Sample after 5½ hours |
| --- | --- | --- |
| Saturated $C_{12}$ acid | 7.3 | 7.3 |
| Mono-ethylenic $C_{14}$ acid | 9.1 | 3.2 |
| Saturated $C_{14}$ acid | 11.6 | 16.9 |
| Mono-ethylenic $C_{16}$ acid | 24.1 | 10.1 |
| Saturated $C_{16}$ acid | 8.8 | 38 |
| Di-ethylenic $C_{18}$ acid | traces | 0 |
| Mono-ethylenic $C_{18}$ acid | 35.9 | 5.5 |
| Saturated $C_{18}$ acid | 0 | 26.3 |

The sample of hydrogenated material taken after 1 hour's reaction was also submitted to this analysis, and no unsaturated materials were found in it.

Example 5

Pure oleic acid having an iodine number of 89.9 and a refractive index of $n_D^{65}$ 1.4440 was hydrogenated using the procedure of Example 1, with 14.7 g. of a nickel on alumina catalyst containing 4.6% nickel, at a reactor bath temperature of 240° C. and a hydrogenation pressure of 160 mm. Using 140 litres per hour of hydrogen, the reaction was continued for 3 hours, during which 28 g. of product was formed. Samples collected after each hour were tested, with results as in Table 3.

TABLE 3

| Time of taking sample, hr. | Melting point, ° C. | Iodine number | Refractive index, $n_D^{65}$ |
| --- | --- | --- | --- |
| 1 | 65 | 2.7 | |
| 2 | 61 | | 1.4375 |
| 3 | 49 | 59.7 | 1.4408 |

While the oleic acid raw material consisted of 100% oleic acid, chromatographic analysis of the sample taken after 3 hours' hydrogenation showed it contained 30.2% of stearic acid.

Example 6

Pure linoleic acid having an iodine number of 183 and a refractive index of $n_D^{65}$ 1.4545 was hydrogenated with a nickel on alumina catalyst (10 g.) containing 8.8% of nickel using the procedure of Example 1. With a reactor bath temperature of 240° C. and a hydrogenation pressure of 180 mm., a hydrogen flow of 120 litres per hour gave in 6 hours some 72 g. of product. Samples of the product collected as it was formed were taken from time to time and examined, some by gas chromatography, with the results shown in Table 4.

TABLE 4

| Time of taking sample, hr. | Melting point, ° C. | Iodine number | Refractive Index, $n_D^{65}$ | Mono-ethylenic $C_{18}$ acid, percent | Stearic acid, percent |
| --- | --- | --- | --- | --- | --- |
| 1 | 67 | 5.8 | 1.4365 | 0 | 100 |
| 2 | 59 | | 1.4365 | | |
| 3 | 54 | 66 | 1.4392 | | |
| 4 | 52 | | 1.4402 | 57.8 | 42.2 |
| 4½ | 50 | | 1.4410 | | |
| 5 | 53 | | 1.4412 | | |
| 5½ | 52 | 72 | 1.4410 | 60.0 | 40.0 |
| 6 | 45 | | 1.4418 | 74.2 | 25.8 |

Example 7

The methyl ester of crude oleic acid (the acid of Example 4), having an iodine number of 74.7 and a refractive index of $n_D^{65}$ 1.4312 was hydrogenated with a nickel on alumina catalyst (13.8 g.) containing 7.0% of nickel using the procedure of Example 1. At a reactor bath temperature of 240° C. and a hydrogenation pressure of 160 mm., hydrogenation was conducted for 4½ hours with a hydrogen flow of 140 litres per hour, yielding 66 g. of hydrogenated ester. Samples were tested as before: the results are given in Table 5.

TABLE 5

| Time of taking sample, hr. | Iodine number | Refractive index, $n_D^{65}$ |
| --- | --- | --- |
| 1 | 1.3 | 1.4202 |
| 2 | | 1.4214 |
| 3 | 1.1 | 1.4230 |
| 4 | 1.2 | 1.4230 |
| 4½ | | 1.4240 |

The methyl ester of the crude oleic acid consisted of esterified materials in the proportions indicated in Example 4 in respect of the crude oleic acid. The samples taken after 1, 2 and 4½ hours were submitted to analysis by gas chromatography and were found to contain no unsaturated compounds.

Example 8

Pure methyl linoleate having an iodine number of 174 and a refractive index of $n_D^{65}$ 1.4452 was hydrogenated with a nickel on alumina catalyst (10.9 g.) having a nickel content of 8.8%, using the procedure of Example 1. With a reactor bath temperature of 240° C., a hydrogenation pressure of 190 mm. and a hydrogen velocity of 120 litres per hour, 82 g. of hydrogenated methyl ester was obtained during 5 hours, and samples were analysed as before, with the results shown in Table 6.

TABLE 6

| Time of taking sample, hr. | Melting point, ° C. | Refractive index, $n_D^{65}$ |
| --- | --- | --- |
| 1 | 39 | 1.4272 |
| 2 | | 1.4266 |
| 3 | 39 | 1.4262 |
| 4 | | 1.4264 |
| 5 | 39 | 1.4264 |

While the raw material consisted of 100% ester of di-ethylenic acid, gas chromatography showed that the sample taken after 1 hour's hydrogenation contained 90.3% of completely saturated ester and 9.7% of mono-ethylenic ester: the sample taken at the end of 5 hours' reaction was analysed in the same way and found to consist of 100% methyl stearate.

What is claimed is:

1. A process for the hydrogenation of a fatty material selected from the group consisting of unsaturated fatty acids and esters thereof with low molecular weight alcohols, said process comprising passing a mixture of hydrogen gas and vapourised fatty material the total vapour pressure of which is less than atmospheric through a pulverulent hydrogenation catalyst at a speed sufficient to maintain the catalyst in the form of a fluidised bed.

2. A process for the hydrogenation of a fatty material selected from the group consisting of unsaturated fatty acids and esters thereof with low molecular weight alcohols, said process comprising passing a mixture of hydrogen gas and vapourised fatty material the total vapour pressure of which is less than 500 mm. through a pulverulent hydrogenation catalyst at a speed sufficient to maintain the catalyst in the form of a fluidised bed.

3. A process for the hydrogenation of a fatty material selected from the group consisting of unsaturated fatty acids and esters thereof with low molecular weight alcohols, said process comprising passing a mixture of hydrogen gas and vapourised fatty material the total vapour pressure of which is between 40 and 200 mm. through a pulverulent hydrogenation catalyst at a speed sufficient to maintain the catalyst in the form of a fluidised bed.

4. A process for hydrogenating an unsaturated fatty acid having from 12 to 24 carbon atoms, said process comprising passing a mixture of vapourised fatty acid and hydrogen through a pulverulent hydrogenation catalyst at a temperature of from 200° to 260° C., at a total vapour pressure for the mixture of between 40 to 200 mm., and at a speed sufficient to maintain the catalyst in the form of a fluidised bed.

5. A process as claimed in claim 4, in which the acid is oleic acid.

6. A process as claimed in claim 4, in which the acid is linoleic acid.

7. A process as claimed in claim 4, in which the acid is linolenic acid.

8. A process for hydrogenating an ester of an unsaturated fatty acid and a low molecular weight alcohol, said process comprising passing a mixture of hydrogen gas and vapourised ester through a pulverulent hydrogenation catalyst at a temperature of from 200° to 260° C., at a total vapour pressure for the mixture of between 40 to 200 mm., and at a speed sufficient to maintain the catalyst in the form of a fluidised bed.

9. A process as claimed in claim 8, in which the ester is a methyl ester.

10. A process as claimed in claim 8, in which the ester is an ethyl ester.

11. A process as claimed in claim 8, in which the ester is an oleate.

12. A process as claimed in claim 8, in which the ester is a linoleate.

13. A process as claimed in claim 8, in which the ester is a linolenate.

References Cited in the file of this patent
UNITED STATES PATENTS

| | | |
|---|---|---|
| 1,185,704 | Ney | June 6, 1916 |
| 2,540,582 | Hockberger | Feb. 6, 1951 |
| 2,757,128 | Hemminger | July 31, 1956 |